United States Patent [19]
Bullivant

[11] 3,763,943
[45] Oct. 9, 1973

[54] MODULAR BATCH WEIGHING CONTROL SYSTEM AND METHOD

[75] Inventor: Kenneth W. Bullivant, Glassboro, N.J.

[73] Assignee: K-Tron Corporation, Glassboro, N.J.

[22] Filed: June 15, 1972

[21] Appl. No.: 263,085

[52] U.S. Cl.................. 177/1, 177/123, 177/DIG. 3
[51] Int. Cl.............................................. G01g 13/02
[58] Field of Search ................. 177/1, 50, 122, 123, 177/210, DIG. 3

[56] References Cited
UNITED STATES PATENTS

| | | | |
|---|---|---|---|
| 3,474,874 | 10/1969 | Pettis, Jr. .......................... | 177/122 X |
| 3,254,728 | 6/1966 | Aquadro et al. .................. | 177/122 X |
| 3,259,199 | 7/1966 | Noble et al. ...................... | 177/210 X |
| 3,643,752 | 2/1972 | Blodgett............................. | 177/122 |
| 3,659,665 | 5/1972 | Godwin et al. .................. | 177/DIG. 3 |

*Primary Examiner*—George H. Miller, Jr.
*Attorney*—Arthur H. Seidel et al.

[57] ABSTRACT

A batch weighing method in which a feeder having a fast and a slow feed rate feeds a hopper being weighed by a weighing means producing a signal indicative of the weight of the hopper. The output signal of the weighing means is first checked to determine whether or not it is within a zero tolerance band before the feeder is turned on. The hopper is then filled at the fast feed rate by the feeder until the hopper is within a predetermined weight of the set point or desired weight. When this weight is reached, called the primary cutoff, the feeder is changed to the slow feed rate. The feeder continues to feed material into the hopper at the slow feed rate until a weight is reached which is a second predetermined weight below the set point weight. At this weight, the feeder is shut off and the material falling from the feeder will bring the weight of the hopper up to set point weight. The weight of the hopper may then be checked to determine whether it is within a predetermined weight of the final set point weight, called a cutoff tolerance. In one embodiment of apparatus, a digital weight signal and a digital signal proportional to the difference between the weight signal and the set point value are generated. The weight signal is checked prior to initiation of the feeder to determine if the hopper is within the zero tolerance limits. The error or difference signal is monitored to detect when the weight is at first and second predetermined weights from the set point weight, that is to detect the primary cutoff and final cutoff points. The error signal results are monitored to determine whether the final weight is within the cutoff tolerance band.

15 Claims, 11 Drawing Figures

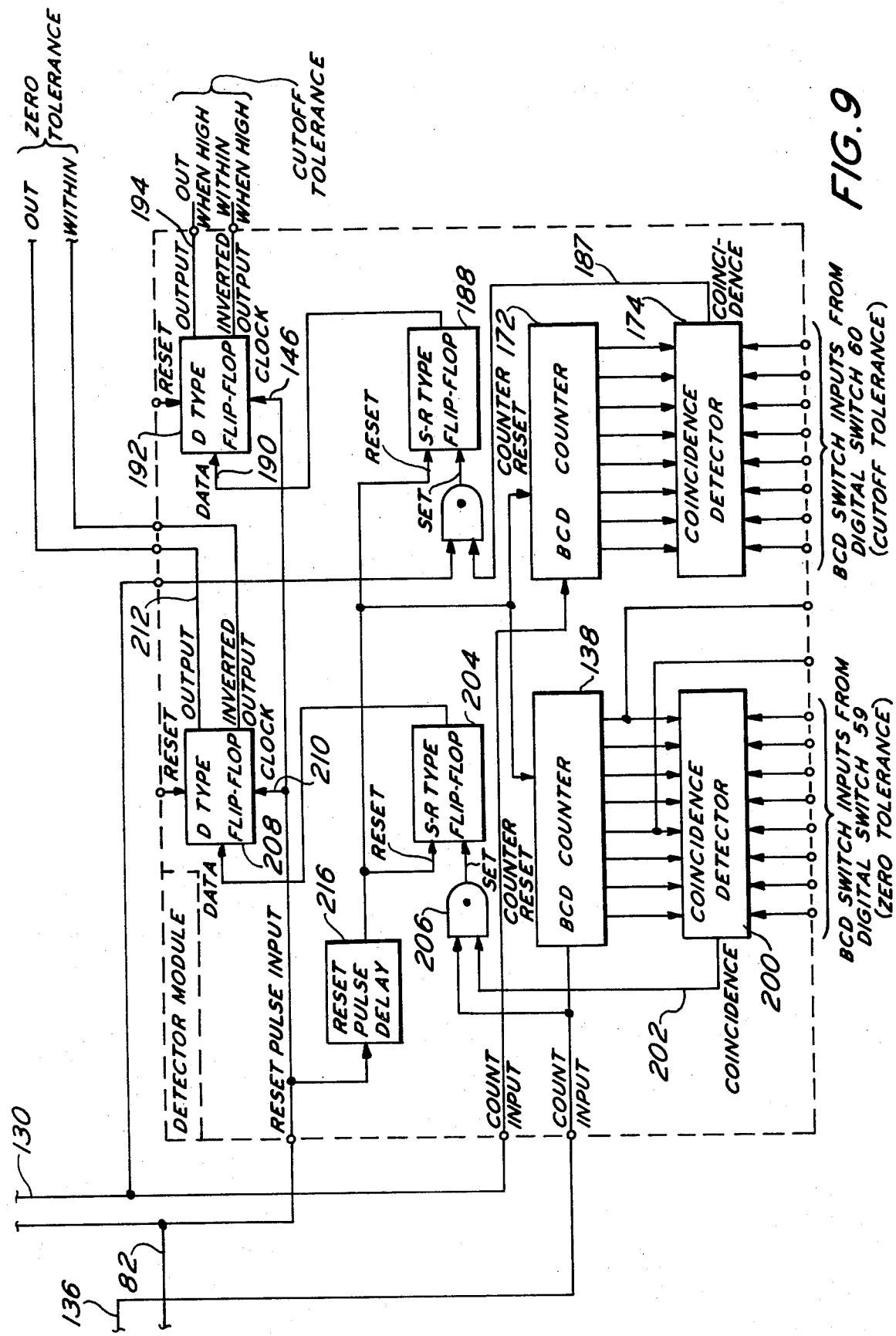

MODULAR BATCH WEIGHING CONTROL SYSTEM AND METHOD

The present invention relates to a modular batch weighing control system and method. More particularly, the present invention relates to a modular batch weighing control system and method in which the final set point or desired weight may be changed while using a particular feeder and a particular type of material by simply making a set point change since primary cutoff and final cutoff are scaled from the set point value. In addition, a zero tolerance band and cutoff tolerance bend checks are automatically made by the control system.

In the past, the batch weighing of materials was often performed by an operator operating the controls of a feeder mechanism. This method of batch weighing was tedious and costly in terms of time and errors in batch weighing. An operator would usually observe a weight read-out during the feeding or filling operation of a hopper or other container. As the weight of the hopper or container approached the desired final weight, the operator would quickly stop the feeding operation. It was necessary to initiate the stopping of the feeder mechanism shortly before the desired weight was actually indicated on the weight read-out device since additional material would be falling through the air from the feeder as the feeder was stopped or cut off.

The method and apparatus of the present invention provide reliable, rapid and efficient batch weighing of materials. Among the advantages of the present invention are the method and means of detecting that the hopper or other suitable container has been completely emptied prior to the initiation of the feeding operation by detecting whether the hopper weight falls within a predetermined zero tolerance limit. Once it is determined that the hopper net weight is within the zero tolerance limit, the hopper may be filled at a rapid rate for the major part of the filling or feeding operation. Once a first predetermined weight below the set point or desired weight is achieved, called the primary cutoff point, the feed rate of the feeder filling the hopper may be reduced to allow more accurate control of final cutoff. When the net weight of the hopper approaches a second predetermined weight below the set point weight, the feeder is cut off or shut off at what is termed the final cutoff point. The net weight of the hopper is then automatically checked to determine whether the final weight is within a cutoff tolerance band. These functions are performed in accordance with the method of the present invention and automatically performed by the apparatus of the present invention.

It may be readily seen that the present invention ensures automatically that the hopper or other container has been emptied of any material from a previous weighing operation. The hopper is then automatically filled at a rapid rate to a major part of the set point weight. This rapid filling operation thereby saves a substantial amount of time in the weighing operation without the sacrifice of reliability or accuracy. Once the net weight of the hopper reaches the primary cutoff value, the feed rate of the feeder may be slowed. This slowing of the feed rate of the feeder thereby provides a more accurate control of the final cutoff weight in operation. When the net weight of the hopper reaches the final cutoff value, the feeder is automatically cut off. The final cutoff value may be slightly below the set point value in order to compensate for material falling through the air from the output of the feeder to the top of the material in the hopper. Therefore, once a particular feeder configuration and weight or density of material being fed are known, the primary cutoff and final cutoff points may be selected as predetermined values below the final set point weight. Therefore, it is unnecessary to change the primary cutoff and final cutoff points when measured as predetermined weights from the final set point weight when feeding the same type of material through the same feeder even though a change in the set point weight or final output weight is desired.

In accordance with the apparatus of the present invention, the control circuitry may be comprised completely of only two different types of modules which may be in the form of printed circuit boards. The use of a minimum of different types of modules is an advantage in trouble shooting and maintaining the system should a defect occur. In many chemical manufacturing plants and factories, it is essential that the plant or factory be operated on a 24 hour basis, 7 days a week. It is therefore essential in these factories that a supply of spare parts be maintained. An advantage of the present system is that only two different types of modules or printed circuit boards need to be maintained. This therefore results in a saving in capital expenditures for the maintenance of a large spare parts inventory.

The apparatus of the present invention uses digital circuitry which provides a high degree of accuracy and does not require periodic calibration. The clock circuit of the present invention may be operated at a high frequency or pulse rate to provide the desired degree of accuracy. The set point value, the primary cutoff and final cutoff points, the zero tolerance and cutoff tolerance may all be readily adjusted or changed in accordance with the present invention by means of thumb wheel or other type of digital switch. Therefore, the batch weighing control system of the present invention is versatile and may be readily adapted to various batch weighing needs.

Briefly, in accordance with the method of the present invention, the hopper or container is continuously weighed and a signal indicative of the weight of the container is produced. The weight signal is monitored or detected to determine whether the weight signal is within a first predetermined limit or a zero tolerance limit before the feeding operation is initiated at a first or fast feed rate. An indication is produced if the weight of the hopper or container before initiating operation is not within the zero tolerance limits. When the weight signal is detected as being a first predetermined value below the set point value, or at primary cutoff, the feed rate of the feeder is changed from a first to a second feed rate, which may be a slower feed rate. When the weight signal is detected as being a second predetermined value below the set point value, or final cutoff, the feeder is finally cut off or shut off.

Briefly in accordance with the apparatus of the present invention, material is fed by a feeder into a container. Means are provided for weighing the container and producing a signal representative of the weight of the container. The output of the weighing means and a set point value is fed to means for generating an error or difference signal proportional to the difference between the weight signal and the predetermined set point value. Means are provided for monitoring the error signal and detecting when the error signal equals a predetermined value. The detecting means produces an output which causes the feeder to be shut off.

In a more detailed embodiment, the error signal is monitored by a first and a second detecting means. The first detecting means detects when the error signal is equal to a first predetermined value and produces an output signal which causes the feeder to shift from a first feed rate to a second feed rate. The second detector means detects when the error signal is equal to a second predetermined value and produces an output signal which causes the feeder to shut off.

In accordance with at least two embodiments of the present invention, a counter or pair of counters are counted in response to pulses generated by a clock generator. The clock signal is gated during the interval between the counter or counters being equal to the weight of the container being weighed and a set point value. In this embodiment a pulse train is generated having a number of pulses proportional to the error or difference between the actual weight and the set point value. This error signal may be fed to another counter or to other counters and the count in the other counter or counters monitored by means of coincidence detection circuitry for various predetermined values from the set point value in order to control the operation of the feeder and to give an indication of whether the final weight is within the cut off tolerance.

For the purpose of illustrating the invention, there are shown in the drawings forms which are presently preferred, it being understood, however, that this invention is not limited to the precise arrangements and instrumentalities shown.

FIGS. 6, 7, 8 and 9 are a schematic diagram, in block diagram form, of an apparatus in accordance with the present invention.

Figure 1:
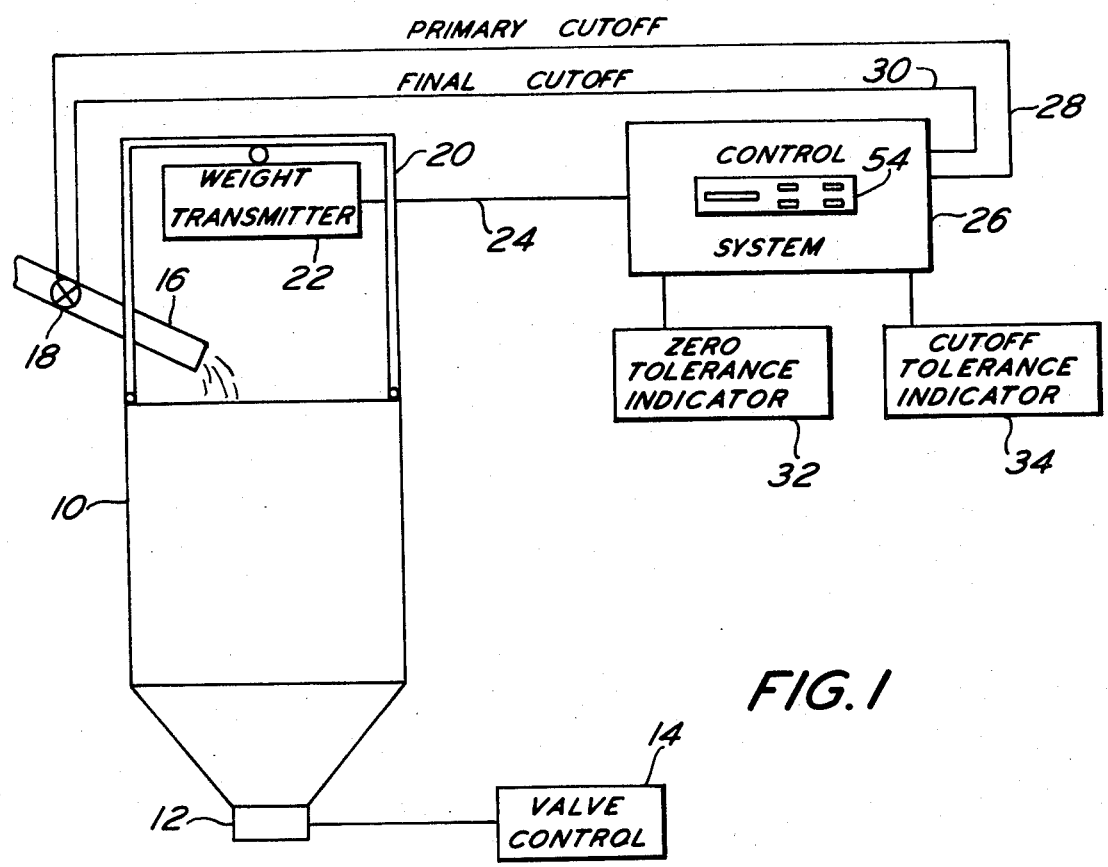
FIG. 1 is a general block diagram of a system in accordance with the present invention.

Referring now to the drawings in detail, wherein like numerals indicate like elements, there is shown in FIG. 1 a hopper or other suitable container 10. The hopper 10 is provided with a valve 12 for ease in emptying the hopper after a batch or predetermined amount of material has been weighed. The valve 12 may be manually operated or may be an electromagnetic valve, pneumatic valve or other suitable valve operated by a valve control 14. Material is fed into hopper 10 by means of feeder 16. Feeder 16 is provided with a two position valve 18. Although feeder 16 is shown in the form of a pipe or conduit provided with a valve, it is understood that feeder 16 may be a two speed conveyor system or any other suitable type of feeder having two feed rates.

In addition, in certain applications, a single speed conveyor belt or other suitable single feed rate feeder may be used where it is not necessary nor desirable to use two feed rates.

The hopper 10 is supported by a yoke or other suitable means 20. The yoke rests on a weight transmitter or load cell 22. The weight transmitter 22 weighs the hopper 10 and provides a digital output signal on line 24 which is fed to control system 26. The weight transmitter 22 may be a mechanical, pneumatic, electrical or any other suitable type of weight transmitter. The weight transmitter 22 may preferably be provided with a tare control in order to compensate for the weight of hopper 10 and yoke 20. However, a tare control would not be absolutely necessary in weight transmitter 22 since this could be compensated for by selecting the zero tolerance band to be centered around the weight of hopper 10 and yoke 20. However, preferably, the weight transmitter would produce a digital output signal on line 24 which is proportional to the net weight in hopper 10. Also, in accordance with a preferred embodiment of the invention disclosed herein, the weight transmitter 22 would preferably produce a binary coded decimal digital output signal on line 24. It is understood that line 24 may actually comprise a plurality of lines. One example of suitable weight transmitter 22 would be a load cell which produces a varying voltage output in proportion to the weight on the load cell and the output of the load cell being fed to a digital voltmeter which converts the varying voltage output of the load cell to a binary coded decimal digital output signal. However, any suitable weight transmitter which produces a binary coded decimal digital output signal may be used as weight transmitter 22.

Control system 26 provides a primary cutoff signal on line 28, a final cutoff signal on line 30, an output to zero tolerance indicator 32 and an output to cutoff tolerance indicator 34.

Figure 2:
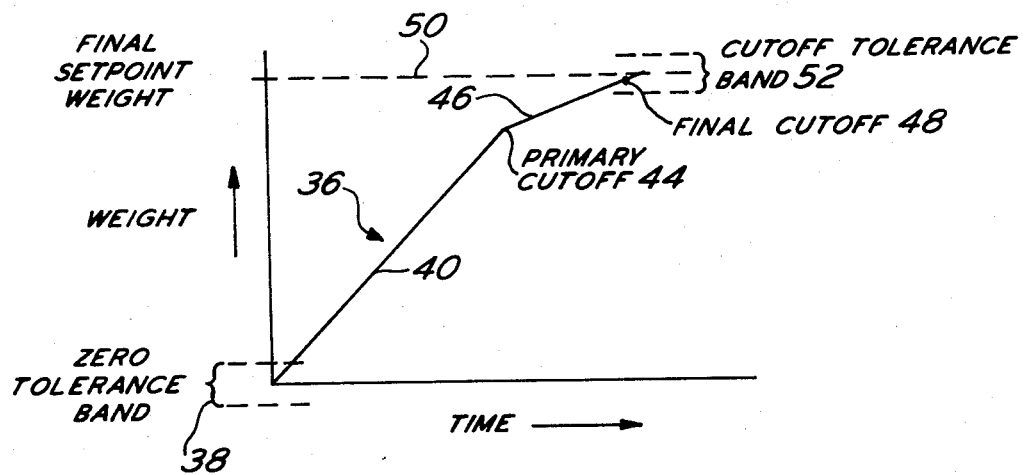
FIG. 2 is a fill rate or weight-time diagram in accordance with the method and apparatus of the present invention.

Referring now to FIG. 2, there is shown a weight-time diagram. Line 36 indicates the net weight of hopper 10. Before feeder 16 is turned on, control system 26 automatically checks to ensure that the net weight of hopper 10 falls within zero tolerance band 38. This check ensures that hopper 10 has been completely emptied of the material contained in the hopper during the previous batch weighing operation. This check for zero tolerance would also indicate any other abnormal condition such as stray material or other undesired matter being in or in contact with the hopper 10 and yoke 20. If control system 26 detects that the net weight of hopper 10 is outside of zero tolerance band 38, control system 26 will provide a signal to zero tolerance indicator 32 which will indicate the abnormal condition. Therefore, an error may be detected in the previous batch weighing operation since all of the material previously weighed may not have been emptied from hopper 10 through valve 12.

The line portion 40 represents a first feed rate or a fast feed rate of feeder 16. That is, line 40 between zero and primary cutoff point 44 represents a fast feed rate of feeder 16. Line 46 between primary cutoff point 44 and final cutoff point 48 represents a second or slower feed rate of feeder 16. Final cutoff 48 appears slightly below the set point weight 50 since additional material may be in the process of falling through the air between the end of the feeder and the top of the material in hopper 10 during and immediately after cutoff. Therefore, when the material falling through the air lands in hopper 10, the actual weight of the material in the hopper will be very close to or exactly at the set point weight. The control system 26 automatically performs a check to determine whether the final actual net weight in hopper 10 is within a cutoff tolerance band 52. If the actual net weight in hopper 10 is not within the limits of the cutoff tolerance band 52, a signal is sent to cutoff tolerance indicator 34 which indicates that the net weight in the hopper is not within cutoff tolerance limits.

Figure 3:
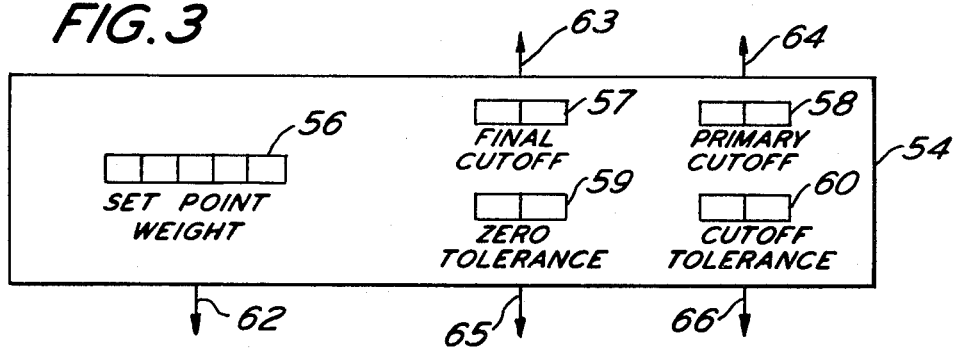
FIG. 3 is a more detailed drawing of the control panel of the control system of FIG. 1.

Referring now briefly to FIG. 3, there is shown in detail a control panel 54 of control system 26 of FIG. 1. The control panel is provided with a plurality of digital switches 56–60. Digital switches 56–60 may be any suitable type of digital switch. However, an example of one type of digital switch is the well known and conventional digital thumb wheel switch which is commercially available. Digital switch 56 is used to enter the set point or desired weight into the control system 26. The output of digital switch 56 is shown schematically as line 62. Similarly, digital switch 57 is used to enter the final cutoff value as a predetermined number of units below the set point weight. The output of digital switch 57 is indicated as being on line 63. Similarly, the outputs of digital switches 58–60 are indicated as lines 64–66, respectively. The lines 62–66, although shown as a single line, may represent a plurality of lines and in particular in a preferred embodiment, would represent four lines for each digit of digital switches 56–60. That is, in one preferred embodiment, the digital switches 46–60 produce an output which is a binary coded decimal output in which four digits or lines are used to represent each decimal. Switch 58 is used to enter a primary cutoff value which is a predetermined weight in pounds, ounces or any other suitable measuring unit below the set point weight entered in digital switch 56. Digital switches 59 and 60 are used to enter acceptable zero and cutoff tolerance limits. That is, if 05 were entered on digital switch 59, that would provide a zero tolerance band 38 of 10 units. In other words, there would be an allowable zero tolerance of +5 and −5 units about the zero value.

Figure 4:
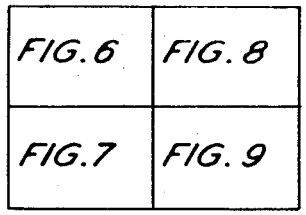
FIG. 4 is a diagram indicating the manner in which the circuits of FIGS. 6, 7, 8 and 9 connect together.
Figure 5:
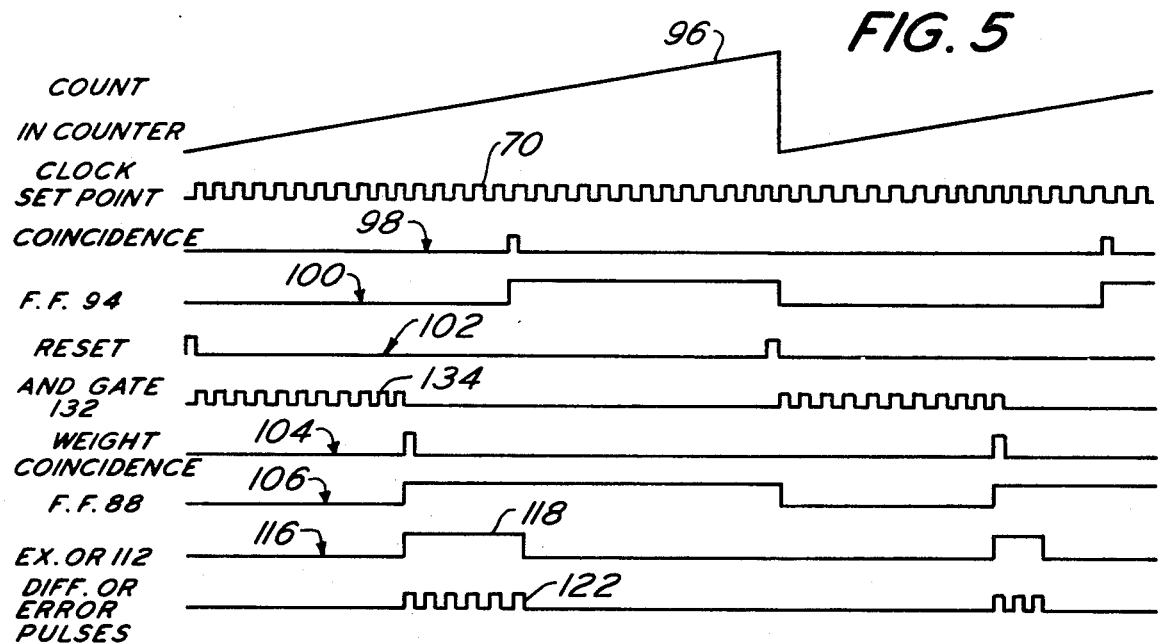
FIG. 5 is a drawing of signals occurring in timed relationship in the apparatus of the present invention.
Figure 6:
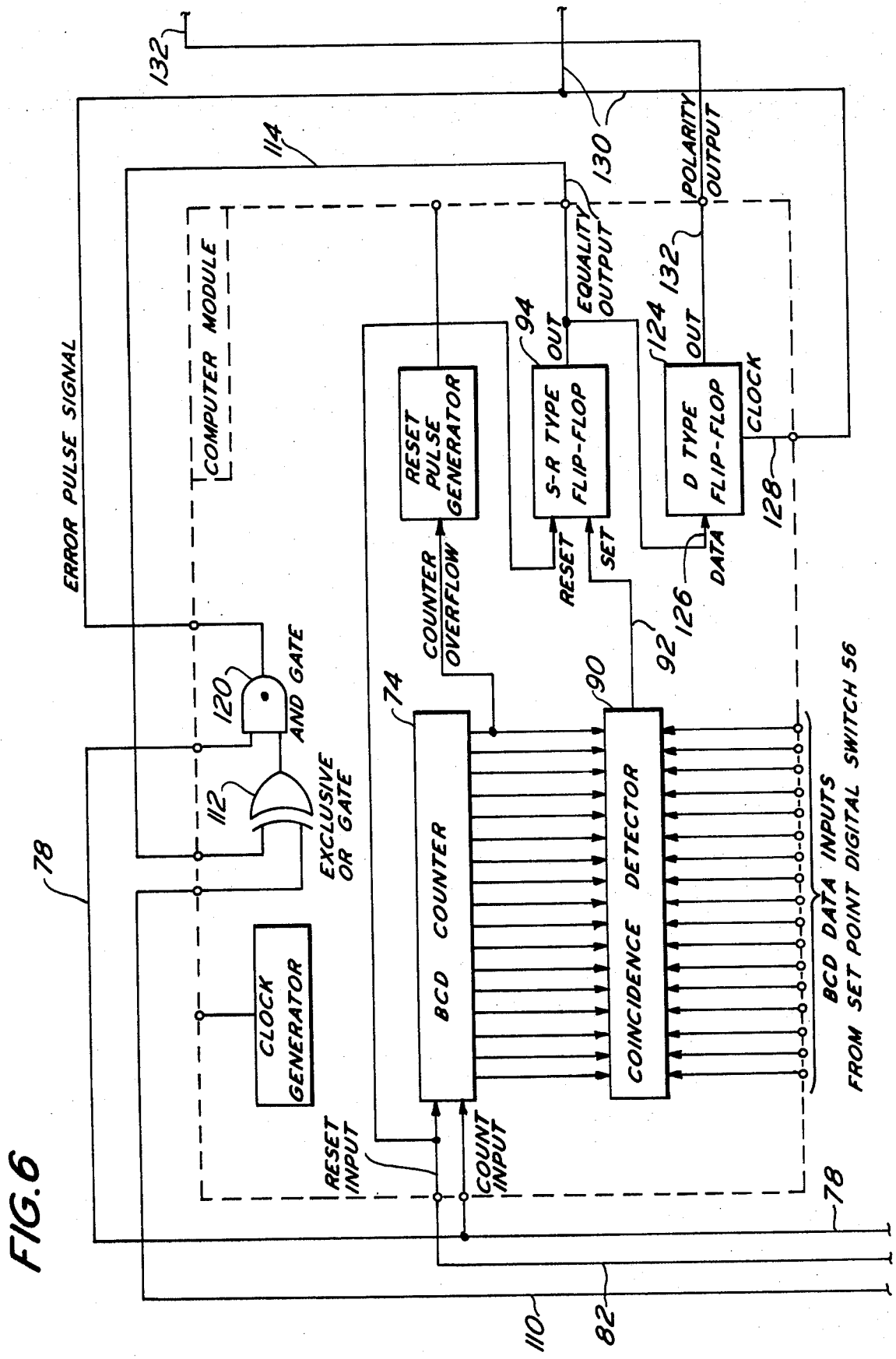
Figure 7:
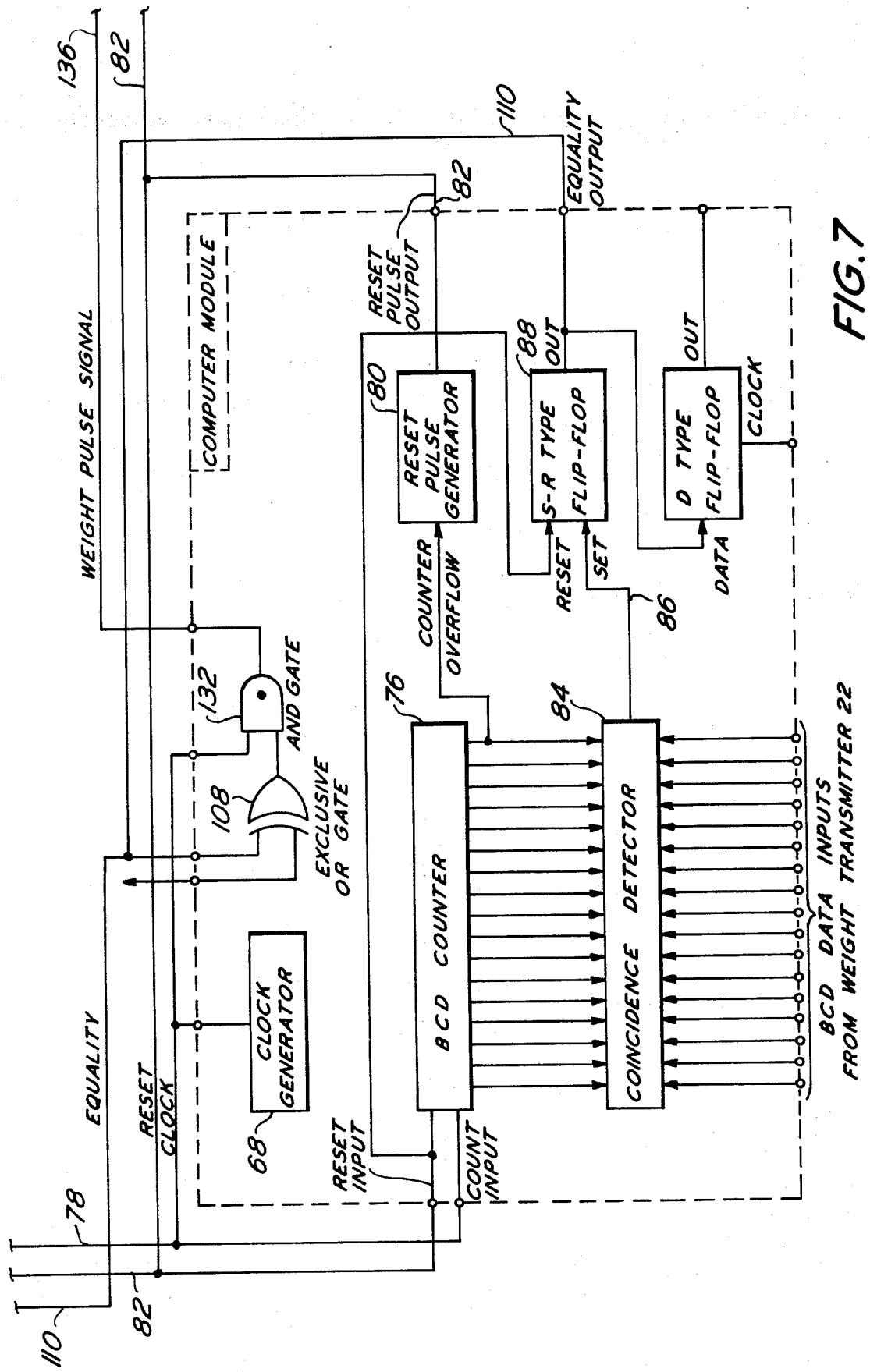
Figure 8:
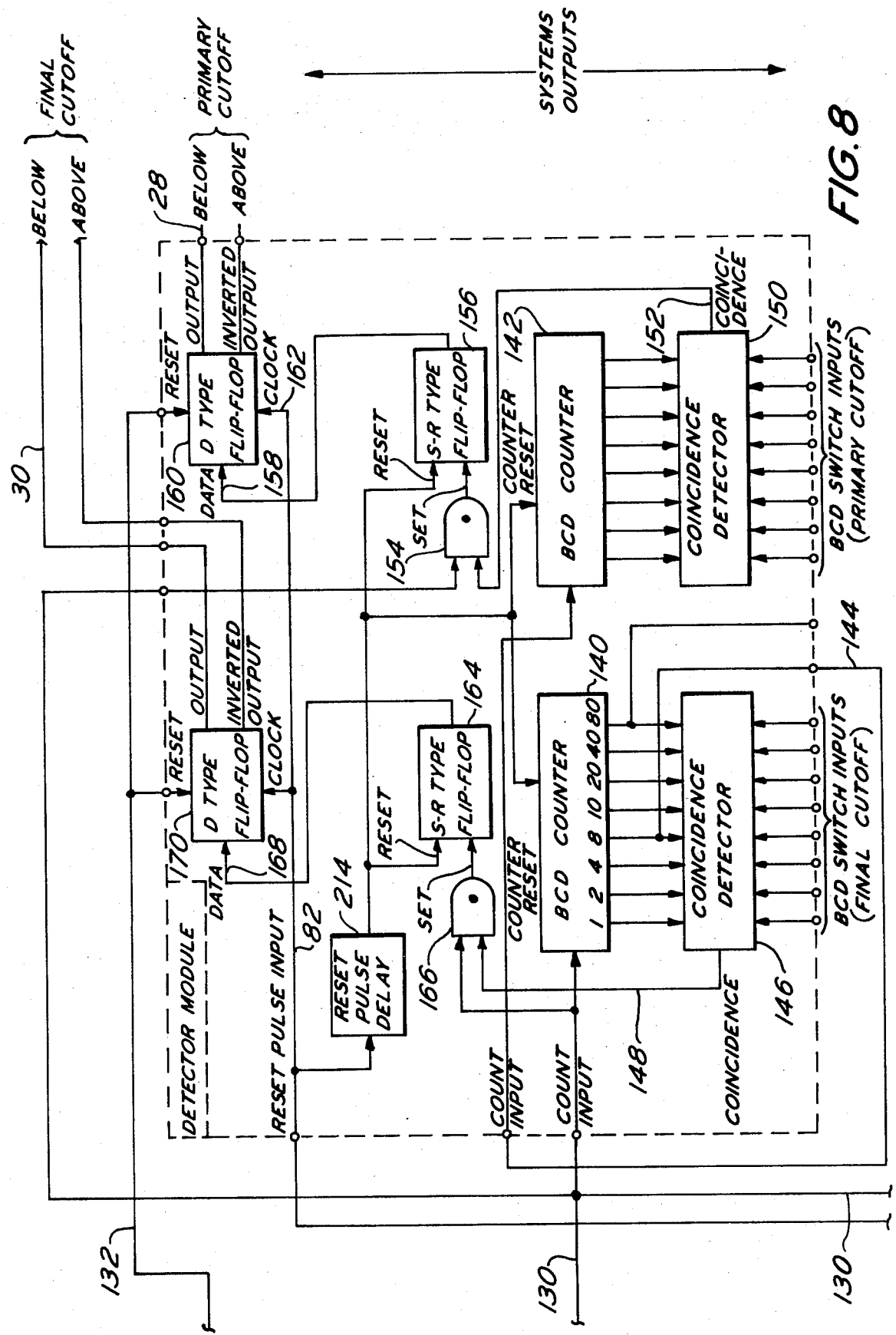

Referring now to FIG. 4, there is shown a diagram which indicates the manner in which FIGS. 6–9 may be connected together as a unit. Referring now to FIGS. 6–9 in conjunction with FIG. 5, there is shown in FIG. 6 a computer module 1 which has circuit components identical to computer module 2 in FIG. 7. Detector module 1 in FIG. 8 is provided with circuit components identical to detector module 2 in FIG. 9. However, by the interconnection wiring as shown, the computer modules 1 and 2 perform different functions as do the detector modules 1 and 2. However, since computer module 1 is identical in structure to computer module 2, they may be interchanged as an aid in trouble shooting the equipment. Also, because of the identical structure inter se the computer modules and inter se the detector modules, only half as many replacement or spare parts need to be retained.

Referring to FIG. 7, there is shown a clock generator 68 for generating clock pulses 70 as shown in FIG. 5. It is understood that by a change in wiring, clock generator 72 on the computer module 1 in FIG. 6 could be used in place of clock generator 68. Similar other possible substitutions will be evident from a perusal of the drawings. However, all of these will not be set forth in detail in order to avoid undue length.

The clock generator 68 supplies inputs to counters 74 and 76 on FIGS. 6 and 7, respectively, via line 78. The counters 74 and 76 may preferably be binary coded decimal counters in this embodiment.

The frequency or pulse rate of clock generator 68 and the capacity of counters 74 and 76 may be selected so that the counters overflow and all circuitry is reset many times during a single batch weighing operation or filling of hopper 10 to the set point weight. Each time counter 76 overflows, reset pulse generator 80 is triggered. Reset pulse generator 80 generates a reset pulse on line 82. The count in counter 76 is continuously compared for coincidence or equality with the output from weight transmitter 22 in coincidence detector 84. When coincidence is detected by coincidence detector 84, an output is produced on the set input of flip flop 88. It is understood that flip flop 88 may be any suitable bistable circuit, device or element. Similarly, the count in counter 74 is continuously compared with the digital setting on digital switch 56 which corresponds to the set point weight. This output of digital switch 56 is applied through line 62 in FIG. 3 to coincidence detector 90. When coincidence detector 90 detects equality or coincidence between the count in counter 74 and the set point value set on digital switch 56, a signal is applied to set input 92 of flip flop 94. These signals are represented in FIG. 5. The sawtooth wave form 96 represents the numeral value of the count in counters 74 and 76 since both of these counters are counted in unison. That is, counters 74 and 76 are simultaneously reset by a reset pulse on line 82 and are then counted by clock pulses 70 generated from clock generator 68. The output of coincidence detector 90 is shown at 98. The output of flip flop 94 which is set by the output of coincidence detector 90 is shown at 100. The output of reset pulse generator 80 is shown at 102, and the outputs of coincidence detector 84 and flip flop 88 are shown at 104 and 106, respectively.

The output of flip flop 88 is applied to one input of exclusive OR gates 108 and 112 via line 110. The output of flip flop 94 is applied to the other input of exclusive OR gate 112 via line 114. Exclusive OR gate 112 is conventional and well known to those skilled in the art. An exclusive OR gate produces a 1 output when one but not both of the inputs are high. Therefore, exclusive OR circuit 112 generates a 1 output during the period of time that either flip flop 94 or 88 is set but not both flip flops 94 and 88 being set. The signals generated during a typical cycle of the control system are shown in FIG. 5. The output of exclusive OR circuit 112 is shown at 116. The 1 output is shown at 118. It is noted that the output of exclusive OR gate 112 goes high or to a 1 when flip flop 88 goes high and then drops back to a 0 when flip flop 94 also goes high. The output of exlcusive OR gate 112 is applied to one input of AND gate 120. The other input of AND gate 120 is supplied with clock pulses 70 from clock generator 68 via line 78. The output of AND gate 120 is shown as pulses 122 during the period of time that the output of exclusive OR circuit 112 is high. The pulses 122 represent the error or difference signal between the output signal from weight transmitter 22 and the set point value on digital switch 56.

Although, as shown in FIG. 5, flip flop 88 is usually set prior to the setting of flip flop 94 during the normal feeding operation by feeder 16 into hopper 10, this is not necessarily so and the actual weight of hopper 10 may exceed the set point value. Where the actual net weight of hopper 10 exceeds the set point value, flip flop 94 would be set prior to the setting of flip flop 88. If this occurred, exclusive OR gate 112 would operate in exactly the same manner. An error or difference signal similar to that illustrated by pulses 122 would also be generated. However, in such case, it would be desirable to have an indication that the weight in hopper 10 is already in excess of the set point value and that further feeding by feeder 16 would increase the number of pulses 122 rather than decrease the number of pulses 122. Therefore, the output of flip flop 94 is fed to a D type flip flop 124.

A D type flip flop is well known to those skilled in the art. A D type flip flop is sometimes known as a delay flip flop. A delay or D type flip flop transfers the condition at the data input to the output during the occurrence of a clocking transition at the clock input. Therefore, a 0 on the data input will be transferred to the output upon the occurrence of a clock pulse and similarly, a 1 on the data input will be transferred to the output upon the occurrence of a clock pulse.

The output of flip flop 94 is fed to the data input 126 of the D type flip flop 124. The error or difference pulse signal output of AND gate 120 is applied to the clock input 128 of delay flip flop 124 via line 130. Therefore, the output on line 132 is high only when coincidence detector 90 produces an output in response to the detection of coincidence and error pulses are generated after the detection of coincidence by coincidence detector 90. In other words, if flip flop 88 is set prior to the setting of flip flop 94, the polarity output of delay flip flop 124 will not go high.

As mentioned above, the output of flip flop 88 is also applied to one input of exclusive OR gate 108. The other input of exclusive OR gate 108 is connected to a source of voltage or in digital logic terminology is tied high. Therefore, exclusive OR gate 108 functions as an inverter. The inverted output of exclusive OR gate 108 is fed to one input of AND gate 132. The other input of AND gate 132 receives clock pulses 70 from clock generator 68 via line 78. Therefore, the output of AND gate 132 is a pulse train signal representative of the weight in hopper 10 as shown at 134 in FIG. 5. This weight pulse signal is a pulse train having a number of pulses proportional to the weight of the material in hopper 10. The weight pulse signal appears on line 136 and is fed to counter 138 in FIG. 9.

The difference or error pulse signal on line 130 is fed to counter 140 in FIG. 8. Counter 142 in FIG. 8 receives a scaled input by connecting to one of the output lines of counter 140 via line 144. Since the counters operate on a transition switching basis, connecting line 144 to the output of counter 140 having a binary coded decimal value of 8 is effectively the same as dividing the error pulses appearing on line 130 by 10. Similarly, by connecting line 144 to the output of counter 140 having a binary coded decimal value of 80 effectively divides the error pulses appearing on line 130 by 100. However, it is understood that the error pulses on line 130 may be fed directly to counter 142 in cases where it is not necessary to select a primary cutoff value much greater than the final cutoff value. Also, a larger capacity counter could be substituted for counter 142 and a digital switch having a larger number of digits in order to eliminate any need for scaling or dividing the pulses on line 130 by a predetermined number. However, in most cases, it is desirable to have the primary cutoff value approximately ten times greater than the final cutoff value from the actual set point value. Therefore, the scaling of the input to counter 142 eliminates the need for providing a larger counter capacity for counter 142 and switch capacity for digital switch 58 and does not even require any additional circuitry for dividing the input by a scaling factor.

The count in counter 140 is compared in coincidence detector 146 with the value set into digital switch 57. When coincidence is detected by coincidence detector 146, an output is generated on line 148. Similarly, the count in counter 142 is compared with the primary cutoff value set in digital switch 58 in coincidence detector 150. Coincidence detector 150 generates an output on line 152 when coincidence is detected. The coincidence output on line 152 is applied to AND gate 154 which causes flip flop 156 to be set. The output of flip flop 156 is applied to data input 158 of delay flip flop 160. Therefore, the output of flip flop 156 is gated to the output when the next reset pulse is generated by reset pulse generator 80 and applied to the clock input 162 of delay flip flop 160 via line 82. The output of delay flip flop 160 is supplied via line 28 to the two position valve or two speed mechanism 18 in order to reduce the flow of feeder 16. It may be noted that as connected and shown in FIG. 8, the two position valve 18 is shifted to a lower feed rate by the output on line 28 going low. If desired, a rising output may be provided by connecting line 28 to the inverted output of D type flip flop 160. It may also be noted that coincidence detector 150 detects coincidence continuously during the period that the net weight of hopper 10 is below the primary cutoff point or weight, and that it is actually the ceasing of coincidence detector 150 to detect coincidence that causes the output of D type flip flop 160 on line 28 to go low and cause two position vlave 18 to shift to a lower feed rate.

Similarly, when coincidence is detected by coincidence detector 146, flip flop 164 is set through AND gate 166. The output of flip flop 164 is applied to data input 168 of delay flip flop 170. Similarly, upon occurrence of the next reset pulse, the output of flip flop 164 is gated to line 30 by delay flip flop 170. The signal on line 30 causes the feeder 16 to be cut off or shut off.

The polarity output on line 132 is applied to the reset terminals of delay flip flops 160 and 170. This polarity output signal applied to the reset terminals of delay flip flops 160 and 170 prevents the turning on of feeder 16 if the actual weight is already above the set point value.

The difference or error pulse signal on line 130 is also applied to the input of counter 172 on FIG. 9. The count in counter 172 is compared in coincidence detector 174 with the digital output from digital switch 60. As discussed above, the counter 172, and all other counters, may be binary coded decimal counters. Similarly, digital switch 60, in addition to all other digital switches, may be binary coded decimal switches. The output of digital switch 60 is fed via line 66 to coincidence detector 174. FIG. 9 shows the plurality of lines which may make up line 66.

Figure 10:
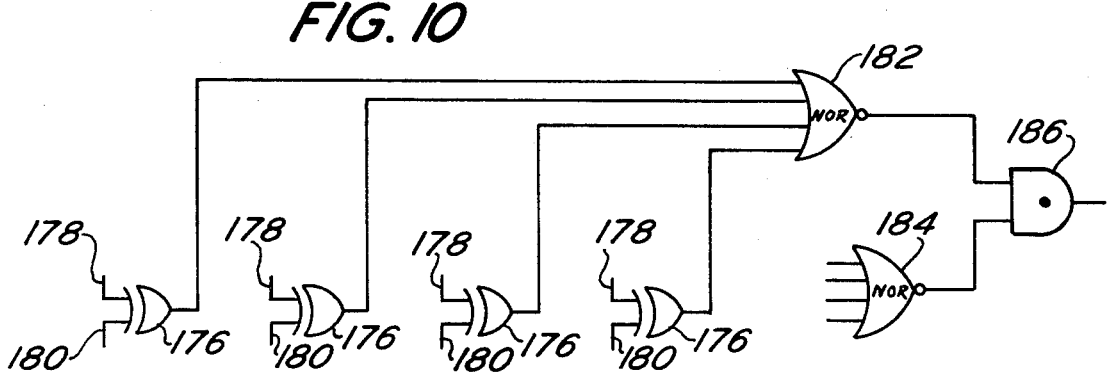
FIG. 10 is a schematic diagram of a portion of a coincidence detector which may be used in accordance with the present invention.

Coincidence detector 174, may operate similar to all of the other coincidence detectors in the system. A partial schematic diagram of one suitable type of coincidence detector which may be used in the system is shown in FIG. 10. There is shown in FIG. 10 four exclusive OR gates 176 each receiving an input 178 from counter 172 and each receiving another input 180 from digital switch 60. The four exclusive OR circuits 176 will individually detect identical signals on their inputs and produce a 0 output when the inputs are identical. Therefore, when the four bit positions making up one of the binary coded decimals have identical values in counter 172 and digital switch 60, each of the exclusive OR gates 176 produces a 0 output to NOR gate 182. Since all of the inputs of exclusive NOR gate 182 are low, or are 0 in digital logic terminology, the output of exclusive NOR gate 182 will be high. Although not shown in FIG. 10, NOR gate 184 would receive the output of four exclusive OR gates, similar to exclusive OR gates 176, which compare the bit positions corresponding to the second binary coded decimal. When both NOR gates 182 and 184 produce a high output, AND gate 186 will produce an output pulse which corresponds to coincidence on line 188 in FIG. 9. The other coincidence detectors may contain similar circuitry. In the case of coincidence detectors 90 and 84 in FIGS. 6 and 7, respectively, there would be a larger number of exclusive OR gates and NOR gates. That is, there would be four exclusive OR gates and a NOR gate for each decimal position compared for coincidence. Although one specific example of the circuitry which may be used in the coincidence detectors has been shown, it is to be understood that any other suitable coincidence detector circuitry may be used.

Returning now to FIG. 9, the coincidence output on line 187 of coincidence detector 174 would set flip flop 188. However, since coincidence detector 174, counter 172 and digital switch 60 are performing a cutoff tolerance check, the actual desired result is that coincidence detector 174 not be set after the cutoff operation. That is, the control system may go through a complete cycle, from reset to reset, in a period of time which may be considerably less than a second. Therefore, if a zero tolerance of 05 is set on digital switch 60, it is desired that the actual wieght of the hopper 10 be within 05 units of the actual set point weight. Therefore, the error signal input on line 130 should be less than five pulses during each cycle. Assuming that the actual weight is two units above or below the set point value set into digital switch 56, coincidence detector 174 would never detect coincidence. In other words, counter 172 would be counted up to 2 and then reset while digital switch 60 would be set at a value of 5.

Therefore, assuming that coincidence has not been detected by coincidence detector 174, flip flop 188 will not be set. The zero or low output of flip flop 188 is applied to data input 190 of delay flip flop 192 and is gated to the output 194 of delay flip flop 192 upon the occurrence of the next reset pulse on clock input terminal 196 of delay flip flop 192. Therefore, the output of delay flip flop 192 is fed to cutoff tolerance indicator 34. However, since the output signal on output terminal 194 is low, cutoff tolerance indicator 34 will not give an alarm or indication that the cutoff tolerance has been exceeded.

The weight pulse signal on line 136 is fed to counter 138. The count in counter 138 is compared in coincidence detector 200 with the zero tolerance limit input from digital switch 59. similar to the operation of coincidence detector 174, it is desired that coincidence detector 200 not generate a coincidence pulse on line 202 if the net weight of hopper 10 at the beginning of the batch weighing operation is within the tolerance limits of zero. If for example some material has stuck to the inside of the hopper from the last batch weighing operation, coincidence detector 200 will detect coincidence and generate a coincidence pulse on line 202. Flip flop 204 will then be set through AND gate 206. The output of flip flop 204 will be gated through delay flip flop 208 when the next reset pulse occurs on clock input 210 of delay flip flop 208. The output of delay flip flop 208 will be fed via line 212 to zero tolerance indicator 32 which will give an alarm or other indication that the net weight of hopper 10 is outside of the zero tolerance limits set into digital switch 59. It is also possible, if desirable, to prevent by means of a gating network the filling of hopper 10 if the zero tolerance limits are exceeded.

Reset pulse delay circuits 214 and 216 on FIGS. 8 and 9, respectively, are used to delay the reset pulse on line 82. It is desirable that reset pulse delay circuits 214 and 216 operate identically for identical reasons and therefore will be discussed only in terms of FIG. 9. However reset pulse delay 214 performs the same function in FIG. 8. Reset pulse delay 216 delays the resetting of flip flops 204 and 188 until the condition set in these flip flops has been gated by delay flip flops 208 and 192 when the undelayed reset pulses are applied to their respective clock terminals 210 and 196. If the reset pulse applied to flip flops 204 and 188 were not delayed, a possible race condition would be created in which flip flops 204 and 188 would be being reset and at the same time their outputs being gated through delay flip flops 208 and 192. Therefore, if reset pulse delay circuit 216 were not provided, it would be possible under certain conditions to get an erroneous output out of the delay flip flops 208 and 194.

Figure 11:
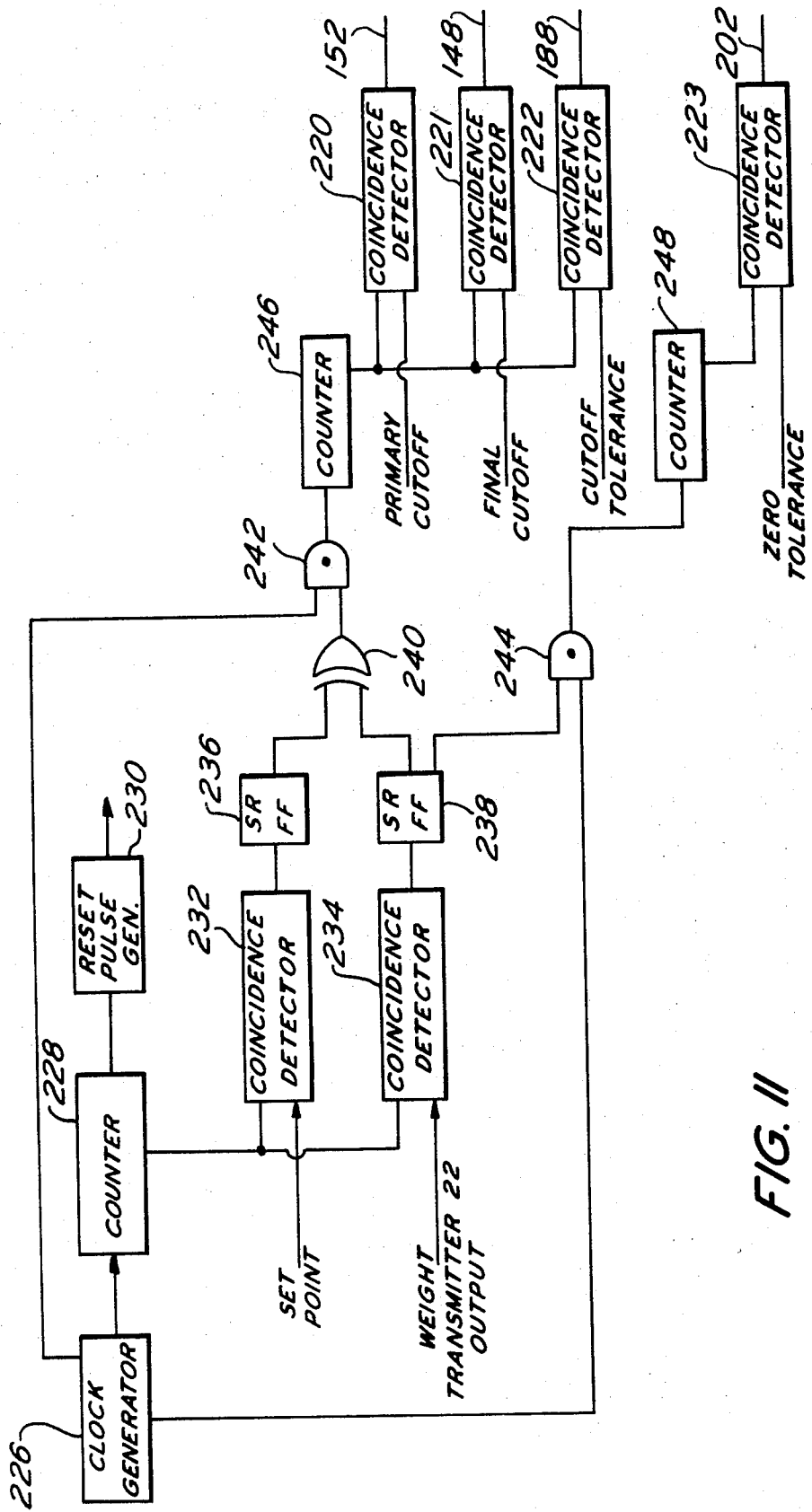
FIG. 11 is a schematic diagram, partially in block diagram form, of an alternate embodiment of the present invention.

Referring now to FIG. 11 there is shown a simplified block diagram of another embodiment of the control system circuitry of the present invention. The outputs of coincidence detectors 220–225 may be connected to similar output circuitry as shown in FIGS. 8 and 9 and therefore the output lines of these coincidence detectors are numbered the same as the output lines of coincidence detectors in FIGS. 8 and 9. The output lines of the counters and the input lines to the coincidence detectors may comprise a plurality of lines as described in FIGS. 6–9. There is shown in FIG. 11 a clock generator 226 which supplies clock pulses to a counter 228. The counter 228 is continuously counted and overflows. Upon the occurrence of each overflow of counter 228, reset pulse generator 230 is triggered and generates a reset pulse which may be supplied to all of the counters in a manner similar to that described in FIGS. 6–9. The output of counter 228 is simultaneously supplied to coincidence gates 232 and 234. Coincidence gate 232 compares the count in counter 228 with a set point value and sets flip flop 236 upon the detection of coincidence. Similarly, coincidence gate 234 compares the count in counter 228 with the output of weight transmitter 22. Upon the detection of coincidence, flip flop 238 is set. Either coincidence gate 232 or 234 may be set first depending upon whether the net weight of hopper 10 is above or below the set point weight. The outputs of flip flops 236 and 238 are fed to exclusive OR gate 240 which operates in a manner similar to exclusive OR gate 112 in FIG. 6. The output of exclusive OR gate 240 is fed to an AND gate 242 which receives a second input from clock generator 226. The output of AND gate 242 would be a difference or error pulse signal having a number of pulses proportional to the difference between the actual net weight of hopper 10 and the set point value. The inverted output of flip flop 238 may be fed to AND gate 244 which receives a second input from clock generator 226. The output of AND gate 244 is a series of pulses or a pulse train having a number of pulses proportional to the actual net weight of hopper 10.

The output of AND gate 242 which is the first pulse train having a number of pulses proportional to the difference between the set point weight and the actual net weight of hopper 10 is fed to a counter 246. Counter 246 counts this difference or error pulse signal and supplies the count as one input to coincidence detectors 220-222. Coincidence detector 220 compares the count in counter 246 with a primary cutoff value and generates an output on line 152 when coincidence is detected. The output on line 152 may be processed in a manner similar to that as shown and described with respect to FIG. 8.

Similarly, coincidence detector 221 detects the count in counter 246 with a final cutoff value which may also be generated by a digital switch. Similarly, the output of coincidence detector appears on line 148 and may be processed as shown and described with respect to FIG. 8 and used to cut off feeder 16 as described with respect to FIG. 1.

Coincidence detector 222 compares the count of counter 246 with a cutoff tolerance value. The output of coincidence detector appears on line 188 and may be processed as shown in FIG. 9 and fed to cutoff tolerance indicator 34 shown on FIG. 1.

The output of AND gate 244 which is a pulse train having a number of signals proportional to the actual net weight in hopper 10 is fed to a counter 248. The count in counter 248 is compared in coincidence detector 223 with a zero tolerance value. The output of coincidence detector 223 appears on line 202 and may be processed as shown in FIG. 9.

It is therefore seen that many modifications and changes may be made within the spirit of the teachings of the present invention. The embodiment in FIG. 11 reduces the number of counters from six to three. Similarly, the delay type flip flops could be replaced with RS latch flip flops. The gating of the signals could be performed in various other manners. Also, it is not necessary to use a binary coded decimal system. However a binary coded decimal system is more convenient since it may be read out directly without the need for code conversion circuitry. Furthermore, it is understood that the designations of high and low outputs are used as commonly accepted by those skilled in the art and may be a positive, negative or zero voltage level as a high output, as long as a different level is selected as a low output.

In view of the above, the present invention may be embodied in other specific forms without departing from the spirit or essential attributes thereof and, accordingly, reference should be made to the appended claims, rather than to the foregoing specification as indicating the scope of the invention.

I claim:

1. A method of batch weighing material fed by a feeder into a container, comprising the steps of:
    weighing said container and producing a digital signal indicative of the weight of the material in said container;
    generating a first pulse train signal having a number of pulses proportional to the difference between a predetermined set point value and the digital signal produced by weighing said container;
    counting said first pulse train signal in a first counter;
    dividing the pulse train by a predetermined number to obtain a second pulse train;
    counting said second pulse train in a second counter;
    comparing the count in said second counter with a predetermined primary cutoff value;
    generating a first output signal when the count in said second counter does not exceed said predetermined primary cutoff value;
    reducing the feed rate of said feeder in response to said first output signal;
    comparing the count in said first counter with a predetermined final cutoff value;
    generating a second output signal when the count in said first counter does not exceed said final cutoff value; and
    stopping said feeder in response to said second output signal.

2. A method in accordance with claim 1 wherein said step of generating a pulse train signal having a number of pulses proportional to the difference between said predetermined set point value and the digital signal produced by weighing said container includes the steps of:
    stepping a third counter in response to a clock signal;
    stepping a fourth counter in response to said clock signal;
    detecting a coincidence between the count in said third counter and said predetermined set point value;
    detecting a coincidence between the count in said fourth counter and the digital signal produced by weighing said container; and
    gating said clock signal during the time interval between the detection of said coincidences to produce said first pulse train signal.

3. A method in accordance with claim 1, including the steps of:
    generating a third pulse train signal having a number of pulses proportional to the digital signal produced by weighing said container;
    applying said third pulse train to a fifth counter;
    comparing the count in said fifth counter with a predetermined zero tolerance value; and
    generating a third output signal when the count in said fifth counter does not exceed said predetermined zero tolerance value.

4. A method in accordance with claim 3, including the step of applying said third output signal to a first indicator means.

5. A method in accordance with claim 1, including the steps of:
    applying said first pulse train signal to a sixth counter;
    comparing the count in said sixth counter with a predetermined cutoff tolerance value; and
    generating a fourth output signal when the count in said sixth counter does not exceed said predetermined cutoff value.

6. A method in accordance with claim 5 including the step of applying said fourth output signal to a second indicator means.

7. Apparatus for batch weighing material fed by a feeder into a container, said feeder having a control means for providing a first and a second feed rate, said first feed rate being greater than said second feed rate, comprising:

means for weighing said container, said weighing means producing a digital signal indicative of the weight of the material in said container;

means for generating a first pulse train signal having a number of pulses proportional to the difference between a predetermined set point value and the digital signal produced by said weighing means;

a first counter for counting the pulses in said first pulse train;

means for dividing said first pulse train by a first predetermined number to obtain a second pulse train;

a second counter for counting said second pulse train;

means for comparing the count in said second counter with a predetermined primary cutoff value and producing a first output signal when the count in said second counter does not exceed said predetermined primary cutoff value, said first output signal being applied to said control means to cause said control means to shift from providing said first feed rate to said second feed rate; and means for comparing the count in said first counter with a predetermined final cutoff value and producing a second output signal when the count in said second counter does not exceed said predetermined final cutoff value, said second output signal being applied to said control means to stop the feeding of material into said container.

8. Apparatus in accordance with claim 7 wherein said container is a hopper having a control valve at the lower end of said hopper and means for operating said control valve.

9. Apparatus in accordance with claim 7 wherein said means for weighing said container produces a binary coded decimal digital signal indicative of the weight of the material in said container.

10. Apparatus in accordance with claim 7 wherein said means for generating the first pulse train signal comprises:

a clock for generating a clock signal;

a third counter, said third counter being stepped in response to said clock signal;

a fourth counter, said fourth counter being stepped in response to said clock signal;

first means for detecting coincidence between the count in said third counter and a predetermined set point value;

second means for detecting coincidence between the count in said fourth counter and the digital signal produced by said weighing means; and means for gating said clock signal during the period of time between detection of coincidence by said first coincidence detector means and said second coincidence detector means in order to produce said first pulse train signal having a number of pulses proportional to the difference between said predetermined set point value and the digital signal produced by said weighing means.

11. Apparatus in accordance with claim 10 wherein said clock gating means comprises:

a first bistable circuit means, said first bistable circuit means being set in response to the detection of coincidence by said first coincidence detector means and producing an output in response to being set;

a second bistable circuit means, said second bistable circuit means being set in response to the detection of coincidence by said second coincidence detector means and producing an output in response to being set;

an exclusive OR gate, said exclusive OR gate having a first and a second input and an output, said output of said first bistable circuit means being applied to said first input of said exclusive OR gate and said output of said second bistable circuit means being applied to said second input of said exlcusive OR gate to produce an output signal having a duration proportional to the difference between said predetermined set point value and the digital signal produced by said weighing means; and an AND gate having a first and second input and an output, said output signal of said exclusive OR gate being applied to said first input of said AND gate and said clock signal being applied to said second input of said AND gate to produce said first pulse train signal having a number of pulses proportional to the difference between said predetermined set point value and the digital signal produced by said weighing means.

12. Apparatus in accordance with claim 10 including means for detecting the simultaneous condition of coincidence in said first coincidence detector means and said first pulse train signal, said detecting means producing an output indicating that the weight of the material in said container is in excess of said predetermined set point value.

13. Apparatus in accordance with claim 7 wherein said dividing means comprises a connection to at least one bit position output of said first counter.

14. Apparatus in accordance with claim 13 including means to inhibit said first and second outputs in response to said detecting means producing an output.

15. Apparatus for batch weighing material fed by a feeder into a container, said feeder having a control means for providing a first and a second feed rate, said first feed rate being greater than said second feed rate, comprising:

means for weighing said container, said weighing means producing a digital signal indicative of the weight of the material in said container;

a first and a second computer module, said first and second computer modules being provided with identical electrical circuits, said electrical circuits including a clock generator, a counter and a coincidence detector on each of said first and second computer modules, means for connecting an output of said clock generator on one of said first and second computer modules to said counters on each of said computer modules, said first computer module coincidence detector detecting coincidence between a count in said counter on said first computer module and a predetermined set point vlaue, said second computer module coincidence detector detecting coincidence between a count in said counter on said second computer module and said digital signal produced by said weighing means, said first computer module producing a first pulse train having a number of pulses proportional to the time difference between detection of coincidence by said coincidence detectors on said first and second computer modules, said second computer module producing a second pulse train having a number of pulses proportional to the count in said counter on said second computer module at the time of detection of coincidence by said coincidence detector on said second computer module;

a first and a second detector modules, said first and second detector modules having identical electrical circuits, said electrical circuits including a first and second counter on each detector module, said first and second counters having a smaller capacity than said counters on said coumputer modules, a first and second coincidence detector on each detector module associated with said first and second counters on each detector module, respectively, said first and second counters on said first detector module and said second counter on said second detector module receiving said first pulse train and being stepped in response thereto, said first and second coincidence detectors on said first detector module and said second coincidence detector on said second detector module detecting predetermined conditions between the count in said counters receiving said first pulse train and predetermined values in order to produce a final cutoff signal, a primary cutoff signal and a cutoff tolerance signal, said first counter on said second detector module receiving said second pulse train and being counted in response thereto, said first coincidence detector on said second detector module comparing the count in said first counter on said second detector module with a predetermined value to generate a zero tolerance signal output;

means responsive to said primary cutoff signal and said final cutoff signal for controlling said control means of said feeder; and means responsive to said cutoff tolerance signal and said zero tolerance signal to indicate whether a tolerance has been exceeded.

* * * * *